Figure 1:
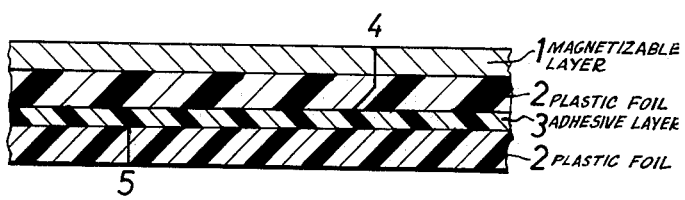

Sept. 7, 1965  W. EICHLER ETAL  3,205,121
PROCESS FOR THE PRODUCTION OF ENDLESS MAGNETIC SOUND TAPES
Filed March 14, 1961

INVENTORS:
WOLFGANG EICHLER, WILHELM ABECK, FRIEDRICH KRONES.
BY
their ATTORNEYS 3,205,121
PROCESS FOR THE PRODUCTION OF ENDLESS
MAGNETIC SOUND TAPES
Wolfgang Eichler, Leverkusen, Wilhelm Abeck, Cologne-Stammheim, and Friedrich Krones, Leverkusen, Germany, assignors to Agfa Aktiengesellschaft, Leverkusen, Germany, a corporation of Germany
Filed Mar. 14, 1961, Ser. No. 95,736
Claims priority, application Germany, Mar. 23, 1960,
A 34,290
2 Claims. (Cl. 161—231)

It is known that extremely high standards are required for lengths of magnetic sound tape which are used in continuously-playing broadcasting apparatus and the like. It is frequently necessary for these lengths to be able to withstand a million or more revolutions. Whereas the magnetic sound tape itself can today be produced in a quality which is fully equal to these requirements, the failure of endless tapes in use is frequent because the joint between the ends of the tape does not withstand the constant load. This applies more especially to magnetic sound tapes having a carrier foil of polyethylene glycol terephthalate (polyester). On account of its excellent mechanical properties, this material is particularly suitable for making tapes subject to extremely high stresses. However, this polyester material can neither be successfully joined wet with adhesives nor can it be successfully heat-sealed. Spliced joints which are made with known adhesive tapes are certainly sufficient for most normal requirements, but are not equal to the loads which occur with the continuous operation of endless lengths of tape. In addition, it is difficult for the spliced joints to be so produced by using known methods that they cannot be detected by their electroacoustic disturbance.

The connection of two magnetic sound tapes has hitherto been effected by placing the two ends of the tape in abutting relationship and sticking a plastic foil behind them. Such spliced joints have various disadvantages, for example they cause uneven running, especially at guide or reversal rollers, and are often inadequately adapted to the guide elements or to the sound head, this resulting in acoustic disturbances. The load capacity of these spliced joints produced by known methods is furthermore insufficient with continuously running endless magnetic sound tapes firstly because the mechanical stresses on the joint, especially on the edges thereof are particularly high, for example at guide or reversing rollers and secondly because of the phenomenon of adhesive cements which is designated as "cold flow" or flow resistance. By this, there is understood flowing away of the adhesive and the irreversible elongation of the spliced joints, which is promoted by the tensile or compressive stresses which occur with the running of the tape. The original load resistance of the joint is thereby considerably reduced.

It has now been found that when using endless magnetic sound tapes on plastic supporting foils, spliced joints can be produced without the previously described disadvantages by coating a magnetic sound tape on the magnetic layer side or the reverse side, over its entire length with an adhesive and by sticking either a plastic foil or a second magnetic sound tape with its layer side or reverse side on to the adhesive layer, the tape carrying the adhesive and the adhesively applied foils or the adhesively applied magnetic sound tape, respectively, being placed together with the ends abutting one another and with the positions of abutment being arranged in staggered relation. The spliced joints manufactured by the process according to the invention withstand extremely high stresses and do not impair the electroacoustic properties of the tape.

Plastics usual for the manufacture of magnetic sound tapes can be used for the magnetic sound carrier and for the foil applied adhesively on the reverse side for example acetyl cellulose, polyesters of terephthalic acid and ethylene glycol, polyurethane, polycarbonate, polyvinyl chloride. Examples of suitable adhesives include flow-resistant pressure sensitive adhesives, for example those based on polyvinyl isobutyl ethers, as well as heat-sensitive adhesives, for example those based on butadiene acrylonitrile. Copolymers of vinyl chloride, vinyl acetate and maleic acid can also be satisfactorily employed. Further heat-sensitive adhesives are described in U.S. patent specification No. 2,909,442; pressure-sensitive adhesives are disclosed in U.S. patent specification 2,177,627 and British specification No. 852,585.

Various types of spliced joints are shown diagrammatically in the accompanying FIGS. 1–4.

The reference numeral 1 represents the magnetizable layer, 2 the plastic foil of the support or the adhesively applied rear foil, 3 the adhesive layer and 4 and 5 designate the staggered abutment positions of the foils.

In FIG. 1, a magnetic tape has a plastic foil struck to the reverse side thereof.

Figure 2:
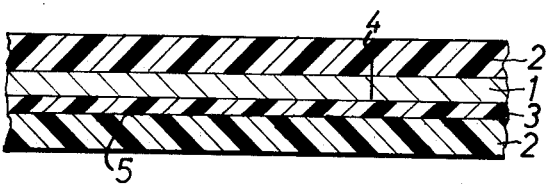

In FIG. 2, the plastic foil is stuck to the magnetizable layer.

Figure 3:
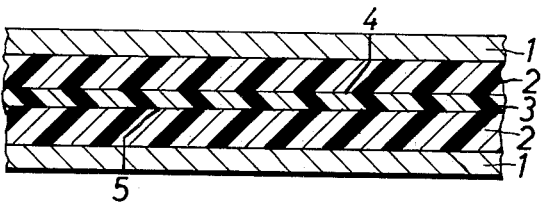

In FIG. 3, two magnetic sound tapes are stuck together with their reverse sides adjacent.

Figure 4:
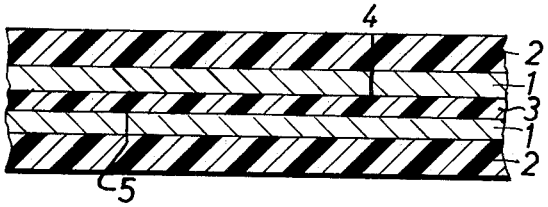

In FIG. 4, two magnetic sound tapes are stuck together with their magnetizable layers adjacent. Such an endless tape may be used in connection with apparatus which allow a short distance between the recording or reproduction heads and the magnetizable layer.

*Example 1*

A magnetic sound tape, the support layer of which consists of the terephthalic ester of ethylene glycol, is coated on its reverse side with a pressure-sensitive adhesive having the following composition:

6.5 parts of polyvinyl isobutyl ether,
3.5 parts of collophony resin,
90.0 parts of benzine and the same magnetic sound tape is stuck thereon by its reverse side.

*Example 2*

A magnetic sound tape of the terephthalic acid ester of ethylene glycol is coated on its reverse side with a heat-sensitive adhesive of the following composition:

13.0 parts of butadiene acrylonitrile,
1.3 parts of silicic acid,
5.2 parts of phenol formaldehyde condensation resin,
3.9 parts of chlorinated rubber,
46.0 parts of ethyl acetate,
15.3 parts of acetone,
15.3 parts of toluene and a polycarbonate foil is then applied thereto with heating.

What is claimed is:
1. In a process for forming an endless magnetic recording tape having a supporting layer of polyethylene terephthalate and a magnetizable layer, the improvement consisting of coating one side of a first magnetic tape with a polymeric resin-based adhesive the resin of which is selected from the group consisting of I a copolymer of butadiene and acrylonitrile and II polyvinyl isobutyl ether, applying a second magnetic tape of substantially the same length to the coated side of said first magnetic recording tape, extending one end of said second tape substantially beyond one end of said first tape and abutting the two ends of said first magnetic recording tape and the two ends of said second tape, wherein the points of abutment or splice are staggered.

2. A composite endless distortion-free recording tape comprising a magnetizable layer coated onto a support of polyethylene terephthalate, the improvement being that said recording tape is joined over its entire length to a second tape of substantially equal length with a polymeric resin-based adhesive the resin of which is selected from the group consisting of I a copolymer of butadiene and acrylonitrile and II polyvinyl isobutyl ether, the two ends of each tape being arranged in abutting relationship and the point of abutment being staggered.

References Cited by the Examiner

UNITED STATES PATENTS

| | | | |
|---|---|---|---|
| 1,104,341 | 7/14 | Blossfeld | 154—52.1 |
| 1,404,848 | 1/22 | Gusdorf | 154—52.1 |
| 1,859,468 | 5/32 | Repony | 154—43 |
| 2,793,153 | 5/57 | Grundel | 154—53.6 |
| 2,825,558 | 3/58 | Devaud | 154—53.6 |
| 2,862,845 | 12/58 | Szegvari | 154—53.6 |
| 2,923,642 | 2/60 | Hausen. | |

FOREIGN PATENTS 1,208,624  9/59  France.

ALEXANDER WYMAN, *Primary Examiner.*

EARL M. BERGERT, CARL F. KRAFFT, *Examiners.*